No. 669,071. Patented Mar. 5, 1901.
J. BROWN.
HORSE STOPPING DEVICE.
(Application filed Aug. 16, 1900.)
(No Model.)
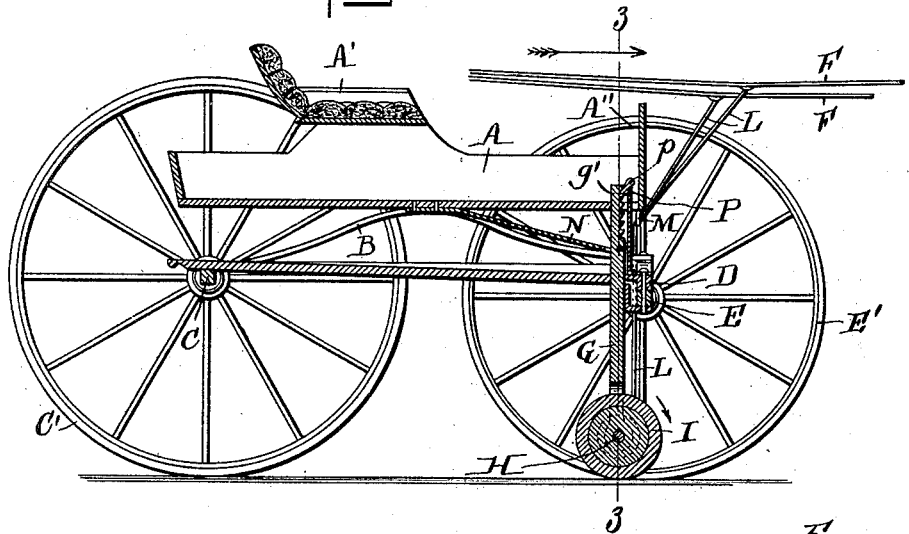
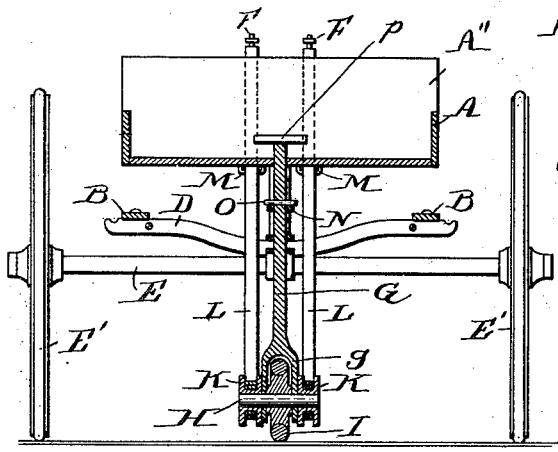
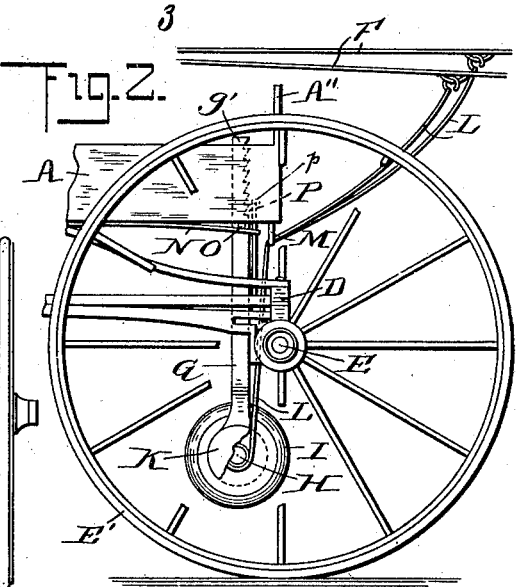
Witnesses= Charles F. Logan. Henry R. Papp
Inventor= Joseph Brown
by  Atty.

UNITED STATES PATENT OFFICE.

JOSEPH BROWN, OF MELROSE, MASSACHUSETTS.

HORSE-STOPPING DEVICE.

SPECIFICATION forming part of Letters Patent No. 669,071, dated March 5, 1901.

Application filed August 16, 1900. Serial No. 27,050. (No model.)

*To all whom it may concern:*

Be it known that I, JOSEPH BROWN, a citizen of the United States, residing at Melrose, in the county of Middlesex and State of Massachusetts, have invented new and useful Improvements in Horse-Stopping Devices, of which the following is a specification.

This invention relates to improvements in devices for stopping runaway horses or for hitching animals; and it is carried out as follows, reference being had to the accompanying drawings, wherein—

Figure 1 represents a longitudinal section of a vehicle provided with my improved horse-stopping device, which latter is shown in operative position. Fig. 2 represents a side elevation of the forward part of the vehicle, showing my improved horse-stopping device as raised when not in use; and Fig. 3 represents a cross-section on the line 3 3 shown in Fig. 1.

Similar letters refer to similar parts wherever they occur on the different parts of the drawings.

A represents a wagon-body of any suitable form or construction, shown as supported on springs B B, having their rear ends secured to the rear axle C and having their front ends secured to the cross-bar D, which is pivoted to the front axle E, as usual.

C' C' are the rear wheels, and E' E' are the front wheels, of the carriage, as usual.

A' represents the seat of the carriage, and A'' represents the dasher at the forward end of the carriage, as is common in vehicles, &c.

F F represent the lines or reins of the harness, leading to the bit in the mouth of the animal.

In suitable guides in the wagon-body or frame supporting the latter is vertically adjustable a bar G, having, preferably, a forked lower end $g$, in which is journaled a shaft or spindle H, to which is secured a wheel or roller I, adapted to be brought in contact with the road or street surface when the device is in use, as represented in Figs. 1 and 3. To the ends of said spindle H are secured the disks or pulleys K K, to which are attached straps or cords L L, connected, preferably, in their upper ends to the lines or reins F F, although, if so desired, said straps L L may be connected directly to the bit without departing from the essence of my invention.

M M are suitable guides or loops on the under side or forward end of the carriage-body, through which the straps or cords L L are guided, as shown in the drawings.

During ordinary driving the roller I is automatically held raised above the ground by the influence of a spring N, which is preferably secured to the under side of the wagon-body and has its free end in contact with the under side of a pin or side projection O on the vertically-adjustable bar G, as shown, and while such roller is held raised the tension on the straps L L is relieved, as shown in Fig. 2, thus allowing the driver to use the lines or reins in the usual manner.

The upper end of the vertically-adjustable bar G is provided with a rack or toothed portion $g'$, adapted to interlock with a suitable spring-pawl P, preferably provided at its upper end with a cross-piece or pedal $p$, as shown.

In case the horse should run away or prove unmanageable all that the driver needs to do is to depress with his foot the bar G until the roller I is pressed firmly against the ground, in which position it will be held by the interlocking of the spring-pawl P with the rack on the said bar G, and as the carriage is being pulled forward by the animal while the roller is in contact with the ground said roller is caused to rotate in the direction of the arrow shown in Fig. 1, and in so doing the straps L L are caused to be wound upon the disks K K, causing the straps L L and the reins F F to be tightened more and more in proportion to the rotation of the roller I and its disks K K, thus automatically pulling upon the bit sufficiently to prevent the horse from running away or to get beyond the control of the driver. The apparatus may also be used as a hitching device by pressing and locking the roller I in contact with the ground, as above described, and thereby automatically causing the straps L L and the reins F F to be powerfully pulled in if the horse starts, and thereby preventing the horse from running away.

To release the roller I and its shank or bar K after being lowered, all that is necessary to do is to release the pawl P from the toothed rack G simply by pressing forward on the pedal $p$ on the upper end of the said spring-pawl P, thus liberating the shank G and causing the roller I to be raised above the ground by the spring N and also causing the tension on the straps L L to be relieved, by which the lines or reins are liberated, so as to enable the driver to use such reins in the usual manner.

The invention is very simple in construction and operation and can be applied to carriages or vehicles of any kind whenever so required.

What I wish to secure by Letters Patent and claim is—

The herein-described device for hitching horses or preventing their running away, consisting in combination, with a wagon or vehicle, longitudinally-adjustable bar G, having a rack in its upper end adapted to interlock with a spring-pawl and having journaled at its lower end a roller I, disks K, K, attached to said roller I and straps or cords attached to said disks and to the reins or other portion of the headstall or harness, substantially as and for the purpose set forth.

In testimony whereof I have hereunto set my hand in presence of two subscribing witnesses.

JOSEPH BROWN.

Witnesses:
ALBAN ANDRÉN,
HENRY IVES TURNER.